United States Patent [19]

Reichelt et al.

[11] Patent Number: 5,158,343
[45] Date of Patent: Oct. 27, 1992

[54] METHOD OF SHORTENING THE BRAKING DISTANCE IN CRITICAL DRIVING SITUATIONS BY SENSING BRAKE PEDAL SPEED

[75] Inventors: Werner Reichelt, Esslingen; Peter Frank, Stuttgart, both of Fed. Rep. of Germany

[73] Assignee: Daimler-Benz AG, Fed. Rep. of Germany

[21] Appl. No.: 677,567

[22] Filed: Mar. 29, 1991

[30] Foreign Application Priority Data

Sep. 6, 1990 [DE] Fed. Rep. of Germany ....... 4028290

[51] Int. Cl.$^5$ .............................................. B60T 7/06
[52] U.S. Cl. .............................. 303/113 SS; 188/353
[58] Field of Search ............ 364/426.02; 280/DIG. 5; 303/1, 9.61, 25, 28, 113 TR, 113 TB, 113 SS, 114 R; 188/382, 151 A, 152, 353

[56] References Cited

U.S. PATENT DOCUMENTS

| | | | |
|---|---|---|---|
| 3,790,225 | 2/1974 | Wehde | 303/113 SS |
| 4,561,527 | 12/1985 | Nakamoto et al. | 188/2 D X |
| 4,640,391 | 2/1987 | Maehara et al. | 188/353 |
| 4,721,192 | 1/1988 | Cano et al. | 188/353 |
| 4,768,841 | 9/1988 | Watanabe | 303/113 SS |
| 4,867,509 | 9/1989 | Maehara et al. | 303/92 |
| 4,914,917 | 4/1990 | Schonlau | 303/114 R X |

FOREIGN PATENT DOCUMENTS

| | | |
|---|---|---|
| 1202659 | 10/1965 | Fed. Rep. of Germany . |
| 3446590 | 6/1985 | Fed. Rep. of Germany ... 303/114 R |
| 2752573 | 10/1986 | Fed. Rep. of Germany . |
| 3544965 | 6/1987 | Fed. Rep. of Germany . |
| 3143792 | 11/1987 | Fed. Rep. of Germany . |
| 3731603 | 5/1988 | Fed. Rep. of Germany . |
| 3809078 | 8/1988 | Fed. Rep. of Germany . |
| 3724896 | 2/1989 | Fed. Rep. of Germany ... 303/114 R |
| 3734489 | 4/1989 | Fed. Rep. of Germany . |
| 8911963 | 12/1989 | Fed. Rep. of Germany . |
| 3900851 | 1/1990 | Fed. Rep. of Germany . |

OTHER PUBLICATIONS

ABS und ASR, Sicherheitsre levante Radschlupf-Regelsysteme, Dr. Burckhardt, 1988.

Primary Examiner—Robert J. Oberleitner
Assistant Examiner—Alfred Muratori
Attorney, Agent, or Firm—Evenson, Wands, Edwards, Lenahan & McKeown

[57] ABSTRACT

A method of shortening the braking distance in critical driving situations uses the criterion of exceeding of a first threshold value by the actuating speed of the brake pedal ($v_{BP}$) by the vehicle driver for initiating an automatic braking operation. A brake pressure ($p_{B,max}$) which corresponds to the value of the brake pressure with optimum deceleration of the vehicle is built up automatically immediately after initiation of the automatic braking operation.

19 Claims, 2 Drawing Sheets

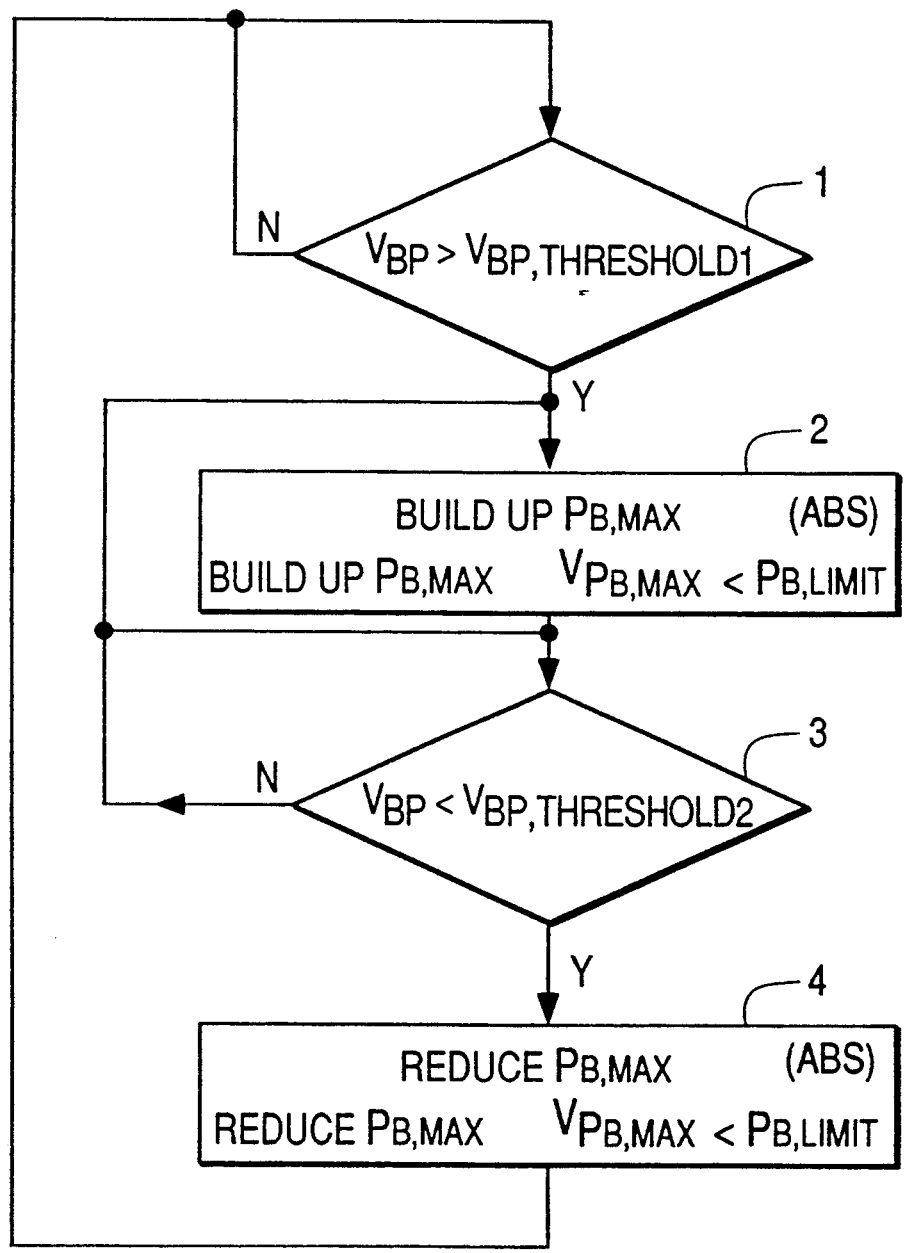

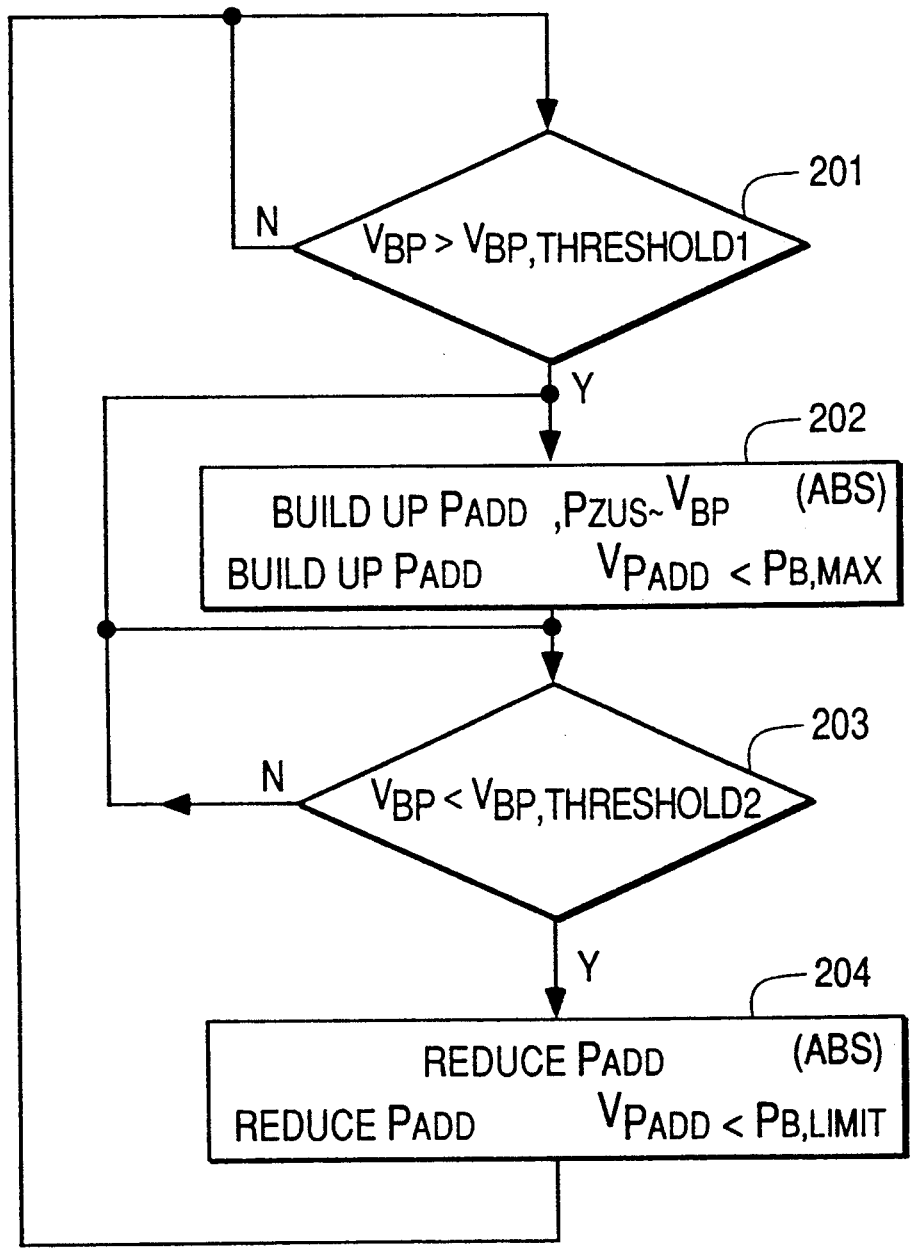

METHOD OF SHORTENING THE BRAKING DISTANCE IN CRITICAL DRIVING SITUATIONS BY SENSING BRAKE PEDAL SPEED

BACKGROUND AND SUMMARY OF THE INVENTION

The invention relates to a method of shortening the braking distance in critical driving situations and, more particularly, to a shortening method which is effected in a simple operation by the vehicle driver.

A method of shortening the braking distance is disclosed in DE 89 11 963 U1 in which a prebraking for a period of about 0.5 s is initiated on the basis of two available signals. The first signal is in this case triggered by a switch being operated by the vehicle driver. It is possible for this switch to be operated by the left foot or by hand. In the case of hand operation, the switch advantageously is arranged such that the hand does not have to be moved away from the steering wheel. The second signal is triggered by the speed at which the vehicle driver removes his foot from the gas pedal being evaluated. If this speed is above a certain threshold value, the prebraking is automatically initiated.

In the known method, disadvantages arise to the extent that a switch has to be additionally operated by the vehicle driver whenever a strong braking operation in the region of a full braking is required. Since very strong braking operations only occur relatively rarely, it may happen that the vehicle driver does not separately operate the switch quickly enough in the event of danger, with the result that a braking operation produced merely by the position of the brake pedal is initiated. Moreover, the two signals available for evaluation still cannot be used to determine an appropriate level for the brake pressure to be set during prebraking. Rather, a standard value for this level must be fixed in advance.

An object of the present invention is to improve the known method of shortening the braking distance in critical driving situations in such a way that the method is brought into effect by as simple an operation as possible by the vehicle driver.

This object has been achieved in accordance with the present invention by using the exceeding of a first threshold value by the actuation speed of the brake pedal as the only criterion for initiating automatic brake operation, and automatically building up a greater brake pressure than that obtained from the brake pedal position immediately after initiating the automatic braking operation.

One advantage of the present invention is that the level of the brake pressure to be adopted can be defined in concrete terms by the fact that the maximum possible braking power occurs. Alternatively the level of the brake pressure to be adopted can be obtained by adding an additional brake pressure $p_{zus}$ to the brake pressure obtained from the instantaneous position of the brake pedal so that altogether the brake pressure $p_{add}$ is adopted. In this latter case, this additional brake pressure can advantageously be determined as a function of the brake pedal angular speed and makes it possible to create a time characteristic of the brake pressure which follows the time characteristic of the position of the brake pedal. As a result, the vehicle driver retains the feeling that the braking operation is still predetermined by the intensity of the actuation of the brake pedal.

The method according to the present invention can be applied in a particularly advantageous way in the case of a vehicle equipped with an antilock braking system (ABS) where a braking operation is always controlled to bring it into the region of safe vehicle handling by the ABS predetermining an upper value $p_{B,limit}$ for the brake pressure $p_{B,max}$ or $P_{add}$ to be adopted.

In the method according to the present invention, the actuation speed of the brake pedal is evaluated to establish whether a first threshold value is exceeded, from which it is then deduced whether the initiation of an automatic braking operation according to the invention is or is not required. This evaluation of the actuating speed of the brake pedal makes it possible to build up at a very early time the brake pressure required for carrying out the automatic braking operation, generally with the result that a considerable shortening of the braking distance can be achieved. This first threshold value can be set much lower if the automatic braking operation is implemented on the principle that the brake pressure to be adopted depends on the actuating speed of the brake pedal than if the automatic braking operation is implemented on the principle that the maximum possible brake pressure is built up immediately.

In a considerable number of cases in which, on the basis of the driving situation, a braking operation is required at a relatively high level, i.e. with a relatively great brake pressure, only a relatively slow build-up of the brake pressure takes place because the vehicle driver does not actuate the brake pedal immediately with full force, but depresses the brake pedal fully only with a time delay. Although also in this case the build-up of the brake pressure brought about by the actuating speed of the brake pedal takes place considerably more quickly than in the case of usual braking operations with safety reserve, the brake pressure build-up still takes place more slowly than would actually be possible.

Even if the vehicle driver actuates the brake pedal with full force, the build-up of the full brake pressure is delayed by the time which is required to depress the brake pedal fully, with the result that here too, an accelerated build-up of the brake pressure is possible by evaluation of the actuating speed of the brake pedal in the case of the braking operation described. Consequently, a shortening of the braking distance can be achieved.

BRIEF DESCRIPTION OF THE DRAWINGS

These and other objects, features and advantages of the present invention will become more apparent from the following detailed description of presently preferred embodiments when taken in conjunction with the accompanying drawings wherein:

FIG. 1 is a flow chart of a first embodiment of the method according to the present invention; and FIG. 2 is a flow chart of a second embodiment of the method according to the present invention.

DETAILED DESCRIPTION OF THE DRAWINGS

In the flow sequence of the method according to the invention in the embodiment of FIG. 1 it is checked in a first step 1 whether the actuating speed of the brake pedal $v_{BP}$ has exceeded a predetermined first threshold value $v_{BP,threshold1}$. This first threshold value may be of the order of magnitude of about $3-6*w_{BP,max}$/s, $w_{BP,max}$ corresponding to the maximum possible brake pedal angle.

If it is established in step 1 that the actuating speed of the brake pedal $v_B$ lies below the first threshold value $v_{BP,threshold1}$, a renewed check corresponding to step 1 takes place once the cycle time $t_{cyc1}$ has elapsed. This cycle time $t_{cyc1}$ may in be on the order of magnitude of about 10-20 ms.

If the actuating speed is above the first threshold value, a transfer takes place to step 2 the maximum brake pressure $p_{B,max}$, corresponding to full braking, being accordingly built up. The order of magnitude of the maximum brake pressure $p_{B,max}$ is in this situation advantageously determined by an upper limit value $p_{B,limit}$ of the maximum brake pressure $p_{B,max}$ being predetermined by an ABS output signal.

In order to ensure that the maximum brake pressure $p_{B,max}$ is reduced in good time when the necessity for full braking has been removed in the embodiment corresponding to FIG. 1, it is checked in step 3 whether the actuating speed of the brake pedal $v_{BP}$ is less than a second threshold value $v_{BP,threshold2}$, i.e. whether the vehicle the intensity of the braking operation and consequently only a braking operation with a lower braking power is required. This value $v_{BP,threshold2}$, may in this case be equal to zero. Alternatively, this second threshold value $V_{BP,threshold2}$ may also be less than zero, in order not to terminate the automatic braking operation in the case of only a brief release of the brake pedal. If the actuating speed of the brake pedal $v_{BP}$ is greater than the second threshold value $v_{BP,threshold2}$, a return is made to step 2, once the cycle time $t_{cyc2}$ has elapsed with changes to the upper limit value $p_{B,limit}$ predetermined by the ABS having the effect under certain circumstances that a different maximum brake pressure $p_{B,max}$ is built up. If no upper limit value $p_{B,limit}$ is predetermined by an ABS, the flow sequence continues once again with step 3 once the cycle time $t_{cyc2}$ with respect to step 1 or to step 3 of the last interrogation has elapsed. This cycle time $t_{cyc2}$ may in this case be on an order of magnitude of about 20 ms.

If it is established in step 3 that the actuating speed of the brake pedal $v_{BP}$ is less than the second threshold value $v_{BP,threshold2}$, a transfer takes place to step 4, in which the maximum brake pressure $p_{B,max}$ is reduced to an order of magnitude corresponding to the brake pedal position, which may under certain circumstances also be controlled by an ABS. Once the cycle time $t_{cyc1}$ with respect to step 3 has elapsed, the interrogation corresponding to step 1 takes place once again.

According to the embodiment of FIG. 2, it is checked in a first step 201 whether the actuating speed of the brake pedal $v_{BP}$ has exceeded a predetermined first threshold value $v_{BP,threshold1}$. Here, this first threshold value may be of the order of magnitude of about 2-3*$w_{BP,max}$/s, $w_{BP,max}$ corresponding to the maximum possible brake pedal angle.

If it is established in step 201 that the actuating speed of the brake pedal $v_{BP}$ lies below the first threshold value $v_{BP,threshold1}$, a renewed check corresponding to step 201 takes place once the cycle time $t_{cyc1}$ has elapsed. This cycle time $t_{cyc1}$ may in this case be of the order of magnitude of about 10-20 ms.

Otherwise, a transfer takes place to step 202, an increased brake pressure $p_{add}$ being accordingly built up, depending on the established brake pedal angular speed $v_{BP}$. This increased brake pressure $p_{add}$ is obtained by a brake pressure $p_{zus}$ corresponding to an additional brake pedal deflection $w_{BP,zus}$ being added to the brake pressure corresponding to the instantaneous brake pedal position $w_{BP}$. The additional brake pedal deflection $w_{BP,zus}$ is obtained in the embodiment of FIG. 2 in proportional relationship to the maximum brake pedal angular speed $v_{BP}$ occurring during the automatic braking operation. The proportionality constant assumes an order of magnitude of 0.03 s. The order of magnitude of the brake pressure $p_{add}$ is advantageously determined by an upper limit value $p_{B,limit}$ of the brake pressure $p_{add}$ being predetermined by an ABS output signal.

In order to ensure that the brake pressure $p_{add}$ is reduced in good time when the necessity for an automatic braking operation has been removed in the embodiment of FIG. 2, it is checked in step 203 whether the actuating speed of the brake pedal $v_{BP}$ is less than a second threshold value $v_{BP,threshold2}$, i.e. whether the vehicle driver wants to reduce the intensity of the braking operation and consequently only a braking operation with a lower braking power is required. This value $v_{BP,threshold2}$ may be equal to zero. Alternatively, this second threshold value $v_{BP,threshold2}$ may also be less than zero, in order not to terminate the automatic braking operation in the case of only a brief release of the brake pedal as in the embodiment of the method described in FIG. 1.

If the actuating speed of the brake pedal $v_{BP}$ is greater than the second threshold value $v_{BP,threshold2}$, once the cycle time $t_{cyc2}$ has elapsed, a return is made to step 202. Changes to the upper limit value $p_{B,limit}$ predetermined by the ABS have the effect under certain circumstances that a different brake pressure is built up than would take place according to the determined brake pressure $p_{add}$. If no upper limit value $p_{B,limit}$ is predetermined by an ABS, the flow sequence of the method continues once again with step 203 once the cycle time $t_{cyc2}$ with respect to step 201 or step 202 of the last interrogation has elapsed. This cycle time $t_{cyc2}$ may in this case be on an order of magnitude of about 20 ms.

If it was established in step 203 that the actuating speed of the brake pedal $v_{VP}$ is less than the second threshold value $v_{BP,threshold2}$, a transfer takes place to step 204. The brake pressure $p_{add}$ is reduced to an order of magnitude corresponding to the brake pedal position, which may under certain circumstances also be controlled by an ABS. This reduction takes place in such a way that the period of time in which the brake pressure $p_{add}$ is taken back to the value of the brake pressure corresponding to the instantaneous brake pedal position is fixed proportionally to the value $v_{BP,zus}$ at the beginning of the reduction of the brake pressure. If, for example, the value is $w_{BP,zus}$ is referred to the maximum deflection of the brake pedal $w_{BP,max}$, the proportionality constant may, for example, be of the order of magnitude of 2-3 s. Once the cycle time $t_{cyc1}$ with respect to step 203 has elapsed, the interrogation according to step 201 takes place again.

In the case of both embodiments of the methods described in FIGS. 1 and 2, the pressure build-up by the automatic braking operation advantageously remains without any reaction on the brake pedal so that the driver retains the feeling that the braking operation is still determined by the intensity of actuation of the brake.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of shortening a braking distance in critical driving situations, comprising the steps of:
   using an exceeding of a first threshold value, said first threshold value being greater than zero, by an actuation speed of a brake pedal caused by a vehicle driver as the only criterion for initiating an automatic braking operation; and,
   automatically building up a greater brake pressure than a brake pressure obtained from a position of the brake pedal immediately after initiating the automatic braking operation.

2. The method according to claim 1, wherein the step of automatically building up the greater brake pressure comprises building up a brake pressure which corresponds to a value of the brake pressure with an optimum vehicle deceleration as the greater brake pressure.

3. The method according to claim 1, wherein the step of automatically building up the greater brake pressure comprises building up a brake pressure, at which a difference of built-up brake pressure from the brake pressure obtained from the brake pedal position is obtained as a function of the brake pedal actuation speed, as the greater brake pressure.

4. The method according to claim 1, wherein the step of automatically building up the greater brake pressure comprises building up a brake pressure, at which a difference of built-up brake pressure from the brake pressure obtained from the brake pedal position is obtained as a function of maximum brake pedal actuation speed occurring during the automatic braking operation, as the greater brake pressure.

5. The method according to claim 1, wherein the steps of using and automatically building are used in a vehicle equipped with an antilock braking system, and an upper limit value for the greater brake pressure is predetermined by the antilock braking system.

6. The method according to claim 5, wherein the step of automatically building up the greater brake pressure comprises building up a brake pressure which corresponds to a value of the brake pressure with an optimum vehicle deceleration as the greater brake pressure.

7. The method according to claim 5, wherein the step of automatically building up the greater brake pressure comprises building up a brake pressure, at which a difference of built-up brake pressure from the brake pressure obtained from the brake pedal position is obtained as a function of the brake pedal actuation speed, as the greater brake pressure.

8. The method according to claim 5, wherein the step of automatically building up the greater brake pressure comprises building up a brake pressure, at which a difference of built-up brake pressure from the brake pressure obtained from the brake pedal position is obtained as a function of maximum brake pedal actuation speed occurring during the automatic braking operation, as the greater brake pressure.

9. The method according to claim 1, wherein the automatic braking operation remains without any reaction on the brake pedal.

10. The method according to claim 9, wherein the step of automatically building up the greater brake pressure comprises building up a brake pressure, which corresponds to a value of the brake pressure with an optimum vehicle deceleration, as the greater brake pressure.

11. The method according to claim 9, wherein the step of automatically building up the greater brake pressure comprises building up a brake pressure, at which a difference of built-up brake pressure from the brake pressure obtained from the brake pedal position is obtained as a function of the brake pedal actuation speed, as the greater brake pressure.

12. The method according to claim 9, wherein the step of automatically building up the greater brake pressure comprises building up a brake pressure, at which a difference of built-up brake pressure from the brake pressure obtained from the brake pedal position is obtained as a function of maximum brake pedal actuation speed occurring during the automatic braking operation, as the greater brake pressure.

13. The method according to claim 9, wherein the steps of using and automatically building are used in a vehicle equipped with an antilock braking system, and an upper limit value for the greater brake pressure is predetermined by the antilock braking system.

14. The method according to claim 1, further including the step of setting the brake pressure to a value corresponding to the position of the brake pedal when the brake pedal actuation speed is in a brake releasing direction.

15. The method according to claim 14, wherein the step of automatically building up the greater brake pressure comprises building up a brake pressure, which corresponds to a value of the brake pressure with an optimum vehicle deceleration, as the greater brake pressure.

16. The method according to claim 14, wherein the step of automatically building up the greater brake pressure comprises building up a brake pressure, at which a difference of built-up brake pressure from the brake pressure obtained from the brake pedal position is obtained as a function of the brake pedal actuation speed, as the greater brake pressure.

17. The method according to claim 14, wherein the step of automatically building up the greater brake pressure comprises building up a brake pressure, at which a difference of built-up brake pressure from the brake pressure obtained from the brake pedal position is obtained as a function of maximum brake pedal actuation speed occurring during the automatic braking operation, as the greater brake pressure.

18. The method according to claim 14, wherein the steps of using and automatically building are used in a vehicle equipped with an antilock braking system, and an upper limit value for the greater brake pressure is predetermined by the antilock braking system.

19. The method according to claim 14, wherein the automatic braking operation remains without any reaction on the brake pedal.

* * * * *